(12) United States Patent
Zhang et al.

(10) Patent No.: US 12,082,128 B2
(45) Date of Patent: Sep. 3, 2024

(54) MANAGING MULTIPLE SIMULTANEOUS PERIODIC UPLINK TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 17/509,931

(22) Filed: Oct. 25, 2021

(65) Prior Publication Data

US 2023/0128596 A1 Apr. 27, 2023

(51) Int. Cl.
*H04W 56/00* (2009.01)
*H04L 1/1812* (2023.01)
*H04L 5/00* (2006.01)
*H04W 28/086* (2023.01)
*H04W 72/21* (2023.01)

(52) U.S. Cl.
CPC ....... *H04W 56/0005* (2013.01); *H04L 1/1812* (2013.01); *H04L 5/001* (2013.01); *H04L 5/0053* (2013.01); *H04W 28/0864* (2023.05); *H04W 72/21* (2023.01)

(58) Field of Classification Search
CPC ............. H04W 56/0005; H04W 72/21; H04W 28/0864; H04L 1/1812; H04L 5/001; H04L 5/0053

USPC .......................................................... 370/329
See application file for complete search history.

(56) References Cited

U.S. PATENT DOCUMENTS

| | | | | |
|---|---|---|---|---|
| 2022/0386355 A1* | 12/2022 | Yi | ........................ | H04W 72/569 |
| 2023/0208597 A1* | 6/2023 | Yao | ..................... | H04B 7/0695 |
| | | | | 370/329 |
| 2023/0299900 A1* | 9/2023 | Gao | ..................... | H04W 72/232 |
| | | | | 370/330 |

* cited by examiner

*Primary Examiner* — Chi Tang P Cheng
(74) *Attorney, Agent, or Firm* — Seyfarth Shaw LLP

(57) ABSTRACT

A method of wireless communication includes receiving a first configuration for a first uplink (UL) transmission at a first time. The first configuration indicates a first transmission configuration indication (TCI) state and a first identifier (ID). A second configuration for a second UL transmission is received at a second time. The second configuration indicates a second TCI state and a second ID. The second UL transmission has a same priority or a same type as the first UL transmission. The first UL transmission is determined to be higher in a hierarchy than the second UL transmission based on a relationship between the first ID and the second ID. The first UL transmission is transmitted with the first TCI state based on the determined hierarchy. The second UL transmission is transmitted with the first TCI state or the second UL transmission is dropped based on the hierarchy.

31 Claims, 5 Drawing Sheets

500

502 — TRANSMIT A FIRST CONFIGURATION FOR A FIRST UPLINK (UL) TRANSMISSION AT A FIRST TIME, THE FIRST CONFIGURATION INDICATING A FIRST TRANSMISSION CONFIGURATION INDICATION (TCI) STATE AND A FIRST IDENTIFIER (ID)

504 — TRANSMIT A SECOND CONFIGURATION FOR A SECOND UL TRANSMISSION AT A SECOND TIME, THE SECOND CONFIGURATION INDICATING A SECOND TCI STATE AND A SECOND ID, THE SECOND UL TRANSMISSION HAVING A SAME PRIORITY OR A SAME TYPE AS THE FIRST UL TRANSMISSION

506 — RECEIVE THE FIRST UL TRANSMISSION WITH THE FIRST TCI STATE, THE FIRST UL TRANSMISSION BEING HIGHER IN A HIERARCHY THAN THE SECOND UL TRANSMISSION BASED ON A RELATIONSHIP BETWEEN THE FIRST ID AND THE SECOND ID

508 — RECEIVE THE SECOND UL TRANSMISSION WITH THE FIRST TCI STATE IN ACCORDANCE WITH THE HIERARCHY

*FIG. 5*

MANAGING MULTIPLE SIMULTANEOUS PERIODIC UPLINK TRANSMISSIONS

FIELD OF THE DISCLOSURE

The present disclosure relates generally to wireless communications, and more specifically to managing multiple simultaneous periodic uplink transmissions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

The present disclosure is set forth in the independent claims, respectively. Some aspects of the disclosure are described in the dependent claims.

In an aspect of the present disclosure, a method for wireless communication, by a user equipment (UE), is provided. The method includes receiving a first configuration for a first uplink (UL) transmission at a first time. The first configuration indicates a first transmission configuration indication (TCI) state and a first identifier (ID). The method also includes receiving a second configuration for a second UL transmission at a second time. The second configuration indicates a second TCI state and a second ID. The second UL transmission has a same priority or a same type as the first UL transmission. Additionally, the method includes determining the first UL transmission is higher in a hierarchy than the second UL transmission based on a relationship between the first ID and the second ID. The method also includes transmitting the first UL transmission with the first TCI state based on the determined hierarchy. Further, the method includes transmitting the second UL transmission with the first TCI state or dropping the second UL transmission, based on the determined hierarchy.

In an aspect of the present disclosure, an apparatus for wireless communication, by a user equipment (UE), is provided. The apparatus includes a memory and one or more processors coupled to the memory. The processor(s) are configured to receive a first configuration for a first uplink (UL) transmission at a first time. The first configuration indicates a first transmission configuration indication (TCI) state and a first identifier (ID). The processor(s) are also configured to receive a second configuration for a second UL transmission at a second time. The second configuration indicates a second TCI state and a second ID. The second UL transmission has a same priority or a same type as the first UL transmission. In addition, the processor(s) are configured to determine the first UL transmission is higher in a hierarchy than the second UL transmission based on a relationship between the first ID and the second ID. The processor(s) are also configured to transmit the first UL transmission with the first TCI state based on the determined hierarchy. Further, the processor(s) are configured to transmit the second UL transmission with the first TCI state or drop the second UL transmission, based on the determined hierarchy.

In an aspect of the present disclosure, an apparatus for wireless communication, by a user equipment (UE), is provided. The apparatus includes means for receiving a first configuration for a first uplink (UL) transmission at a first time. The first configuration indicates a first transmission configuration indication (TCI) state and a first identifier (ID). The apparatus also includes means for receiving a second configuration for a second UL transmission at a second time. The second configuration indicates a second TCI state and a second ID. The second UL transmission has a same priority or a same type as the first UL transmission. Additionally, the apparatus includes means for determining the first UL transmission is higher in a hierarchy than the second UL transmission based on a relationship between the first ID and the second ID. The apparatus also includes means for transmitting the first UL transmission with the first TCI state based on the determined hierarchy. Further, the apparatus includes means for transmitting the second UL transmission with the first TCI state or dropping the second UL transmission, based on the determined hierarchy.

In an aspect of the present disclosure, a non-transitory computer readable medium is provided. The computer readable medium has encoded thereon program code for wireless communication, by a user equipment (UE). The program code is executed by a processor and includes code to receive a first configuration for a first uplink (UL) transmission at a first time. The first configuration indicates a first transmission configuration indication (TCI) state and a first identifier (ID). The program code also includes code to receive a second configuration for a second UL transmission at a second time. The second configuration indicates a second TCI state and a second ID. The second UL transmission has a same priority or a same type as the first UL transmission. Additionally, the program code includes code to determine the first UL transmission is higher in a hierarchy than the second UL transmission based on a relationship between the first ID and the second ID. The program code also includes code to transmit the first UL transmission with the first TCI state based on the determined hierarchy. Furthermore, the program code includes code to transmit the second UL transmission with the first TCI state or drop the second UL transmission, based on the determined hierarchy.

The present disclosure is set forth in the independent claims, respectively. Some aspects of the disclosure are described in the dependent claims.

In an aspect of the present disclosure, a method for wireless communication, by a base station (BS) is provided. The method includes transmitting a first configuration for a first uplink (UL) transmission at a first time. The first configuration indicates a first transmission configuration indication (TCI) state and a first identifier (ID). The method also includes transmitting a second configuration for a second UL transmission at a second time. The second configuration indicates a second TCI state and a second ID. The second UL transmission has a same priority or a same type as the first UL transmission. Additionally, the method includes receiving the first UL transmission with the first TCI state. The first UL transmission is higher in a hierarchy than the second UL transmission based on a relationship between the first ID and the second ID. Further, the method includes receiving the second UL transmission with the first TCI state in accordance with the hierarchy.

In an aspect of the present disclosure, an apparatus for wireless communication, by a base station (BS) is provided. The apparatus includes a memory and one or more processors coupled to the memory. The processor(s) are configured to transmit a first configuration for a first uplink (UL) transmission at a first time. The first configuration indicates a first transmission configuration indication (TCI) state and a first identifier (ID). The processor(s) are also configured to transmit a second configuration for a second UL transmission at a second time. The second configuration indicates a second TCI state and a second ID. The second UL transmission has a same priority or a same type as the first UL transmission. In addition, the processor(s) are configured to receive the first UL transmission with the first TCI state. The first UL transmission is higher in a hierarchy than the second UL transmission based on a relationship between the first ID and the second ID. Further, the processor(s) are configured to receive the second UL transmission with the first TCI state in accordance with the hierarchy.

In an aspect of the present disclosure, an apparatus for wireless communication, by a base station (BS) is provided. The apparatus includes means for transmitting a first configuration for a first uplink (UL) transmission at a first time. The first configuration indicates a first transmission configuration indication (TCI) state and a first identifier (ID). The apparatus also includes means for transmitting a second configuration for a second UL transmission at a second time. The second configuration indicates a second TCI state and a second ID. The second UL transmission has a same priority or a same type as the first UL transmission. Additionally, the apparatus includes means for receiving the first UL transmission with the first TCI state. The first UL transmission is higher in a hierarchy than the second UL transmission based on a relationship between the first ID and the second ID. Further, the apparatus includes means for receiving the second UL transmission with the first TCI state in accordance with the hierarchy.

In an aspect of the present disclosure, a non-transitory computer readable medium is provided. The computer readable medium has encoded thereon program code for wireless communication, by a base station (BS). The program code is executed by a processor and includes code to transmit a first configuration for a first uplink (UL) transmission at a first time. The first configuration indicates a first transmission configuration indication (TCI) state and a first identifier (ID). The program code also includes code to transmit a second configuration for a second UL transmission at a second time. The second configuration indicates a second TCI state and a second ID. The second UL transmission has a same priority or a same type as the first UL transmission. Additionally, the program code includes code to receive the first UL transmission with the first TCI state. The first UL transmission is higher in a hierarchy than the second UL transmission based on a relationship between the first ID and the second ID. Furthermore, the program code includes code to receive the second UL transmission with the first TCI state in accordance with the hierarchy.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 5 is a flow diagram illustrating an example process performed, for example, by a base station, in accordance with various aspects of the present disclosure.

DETAILED DESCRIPTION

Figure 1:
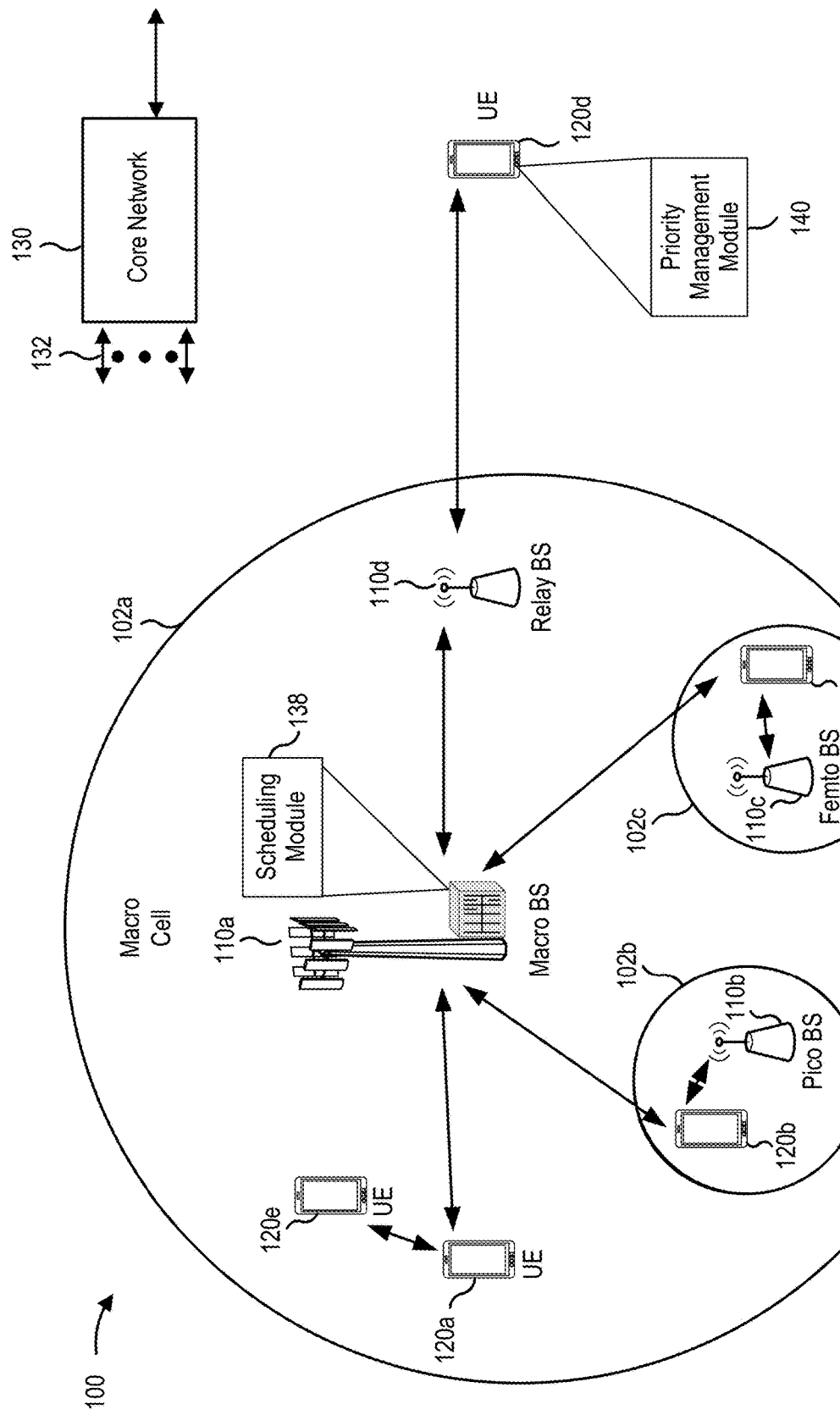
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In 3GPP Release 15/16, to reduce data transmission latency, a base station (e.g., a gNode B (gNB)) may schedule multiple periodic uplink (UL) transmissions for a user equipment (UE). In addition to dynamic scheduling, in which a scheduler uses control signaling to instruct a UE to transmit or receive for each transmission interval, semi-persistent scheduling in the downlink (DL) configures a UE with a periodicity for data transmission using radio resource control (RRC) signaling. When semi-persistent scheduling is activated, the UE may monitor a physical downlink control channel for uplink and downlink scheduling commands. For example, the periodic UL transmissions may be multiple configured grants (e.g., CG 1+CG 2) or multiple sounding reference signals (e.g., SRS 1+SRS 2). Configured grants are a scheduling mechanism for bypassing the signaling entailed with dynamic scheduling (e.g., scheduling requests and scheduling grants). The configured grant (CG) may be a type 1 configured grant (CG1) or a type 2 configured grant (CG2). A CG1 is an uplink grant provided by RRC signaling including activation of the grant. A CG2 is a grant in which the transmission periodicity is provided by RRC signaling with layer one/layer two (L1/L2) control signaling to activate or deactivate the uplink transmission. Sounding reference signals (SRSs) are periodic UL reference signals transmitted by the UE to a base station that enable the base station to measure and report the received signal power and determine positioning of the UE as well as channel conditions.

Each UL transmission may have a different periodicity as well as a different duration for each occasion. As a result, a portion of the first UL transmission may overlap the second UL transmission or the first and second UL transmissions may fully overlap. Under conventional approaches, if the UL transmissions are CGs with different priorities, then the lower priority CG will be dropped. However, if the two CGs have the same priority, then the two CGs will be simultaneously transmitted. On the other hand, under conventional approaches, if the UL transmission is an SRS, the SRS is deemed to have low priority, or no priority (which means low priority). As such, the priority will be aperiodic (AP) SRS> semi-persistent (SP) SRS> periodic (P) SRS. However, if two SRSs have the same type (e.g., aperiodic), then priority is determined based on UE implementation.

It is problematic when two UL transmissions (e.g., two CGs/two SRSs) are configured on two different active beams, e.g., transmission configuration indication (TCI) states, such as to achieve spatial diversity. The simultaneous transmissions may result in a dropped connection, data loss, increased power consumption, and poor performance.

In accordance with aspects of the present disclosure, a beam for conducting simultaneous UL transmissions based on configured grants (CGs) with the same priority level may be determined. In some aspects, the beam may be determined based on the component carrier index. In other aspects, the beam for conducting simultaneous UL transmissions based on CGs with the same priority level may be determined based on a hybrid automatic repeat request (HARQ) identifier (ID). In still other aspects, the beam for conducting simultaneous UL transmissions based on CGs with the same priority level may be determined based on beam measurement results. In other aspects, the beam for conducting simultaneous UL transmissions based on CGs with the same priority level may be determined based on the CG configuration ID.

Additionally, in some aspects, when simultaneous UL transmissions involve two SRSs, a beam may be determined for the simultaneous transmissions. In some aspects, when simultaneous UL transmissions involve two SRSs of the same priority type (e.g., aperiodic), one of the SRSs may be dropped. The SRS UL transmitted (or dropped) may be determined in a manner similar to that specified above for determining a beam for transmitting simultaneous UL CGs. That is, in some aspects, the beam for transmitting both SRSs or the SRS UL transmitted (or dropped) may be determined based on the CC index, HARQ ID, and/or the latest beam measurement results on each of the different active beams/TCI states. If one of the measurement results indicate that one of the active beams has a stronger signal (e.g., larger reference signal received power (RSRP)/signal to interference plus noise ratio (SINR)), then the TCI state with better RSRP/SINR may transmit both SRS UL transmissions. Alternatively, the SRS associated with the TCI state with better RSRP/SINR may be transmitted and the other SRS UL transmission may be dropped.

In some aspects, the beam for transmitting both SRSs or the SRS UL transmitted (or dropped) may be determined based on an SRS resource ID or SRS resource set ID. For example, if the two UL SRS transmissions are scheduled with two different SRS configurations including two SRS resource/resource set IDs, then the lowest (or highest) resource/resource set ID may be prioritized. As such, the TCI state associated with the lowest (or highest) resource/resource set ID may transmit both the two UL SRSs from the UE. By handling periodic overlapping transmissions as described, battery power may be saved and transmission reliability may be improved.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a priority management module 140. For brevity, only one UE 120*d* is shown as including the priority management module 140. The priority management module 140 may receive a first configuration for a first uplink (UL) transmission at a first time. The first configuration indicates a first transmission configuration indication (TCI) state and a first identifier (ID). The priority management module 140 may also receive a second configuration for a second UL transmission at a second time. The second configuration indicates a second TCI state and a second ID. The second UL transmission has a same priority or a same type as the first UL transmission. In addition, the priority management module 140 may determine the first UL transmission is higher in a hierarchy than the second UL transmission based on a relationship between the first ID and the second ID. The priority management module 140 may transmit the first UL transmission with the first TCI state based on the determined hierarchy. Further, the priority management module 140 may transmit the second UL transmission with the first TCI state or dropping the second UL transmission, based on the determined hierarchy.

The core network 130 or the base stations 110 may include a scheduling module 138. The scheduling module 138 may transmit a first configuration for a first uplink (UL) transmission at a first time. The first configuration indicates a first transmission configuration indication (TCI) state and a first identifier (ID). The scheduling module 138 may transmit a second configuration for a second UL transmission at a second time. The second configuration indicates a second TCI state and a second ID. The second UL transmission has a same priority or a same type as the first UL transmission. The scheduling module 138 may receive the first UL transmission with the first TCI state. The first UL transmission is higher in a hierarchy than the second UL transmission based on a relationship between the first ID and the second ID. The scheduling module 138 may receive the second UL transmission with the first TCI state in accordance with the hierarchy.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrow band internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

As indicated above, FIG. 1 is provided merely as an example. Other examples may differ from what is described with regard to FIG. 1.

Figure 2:
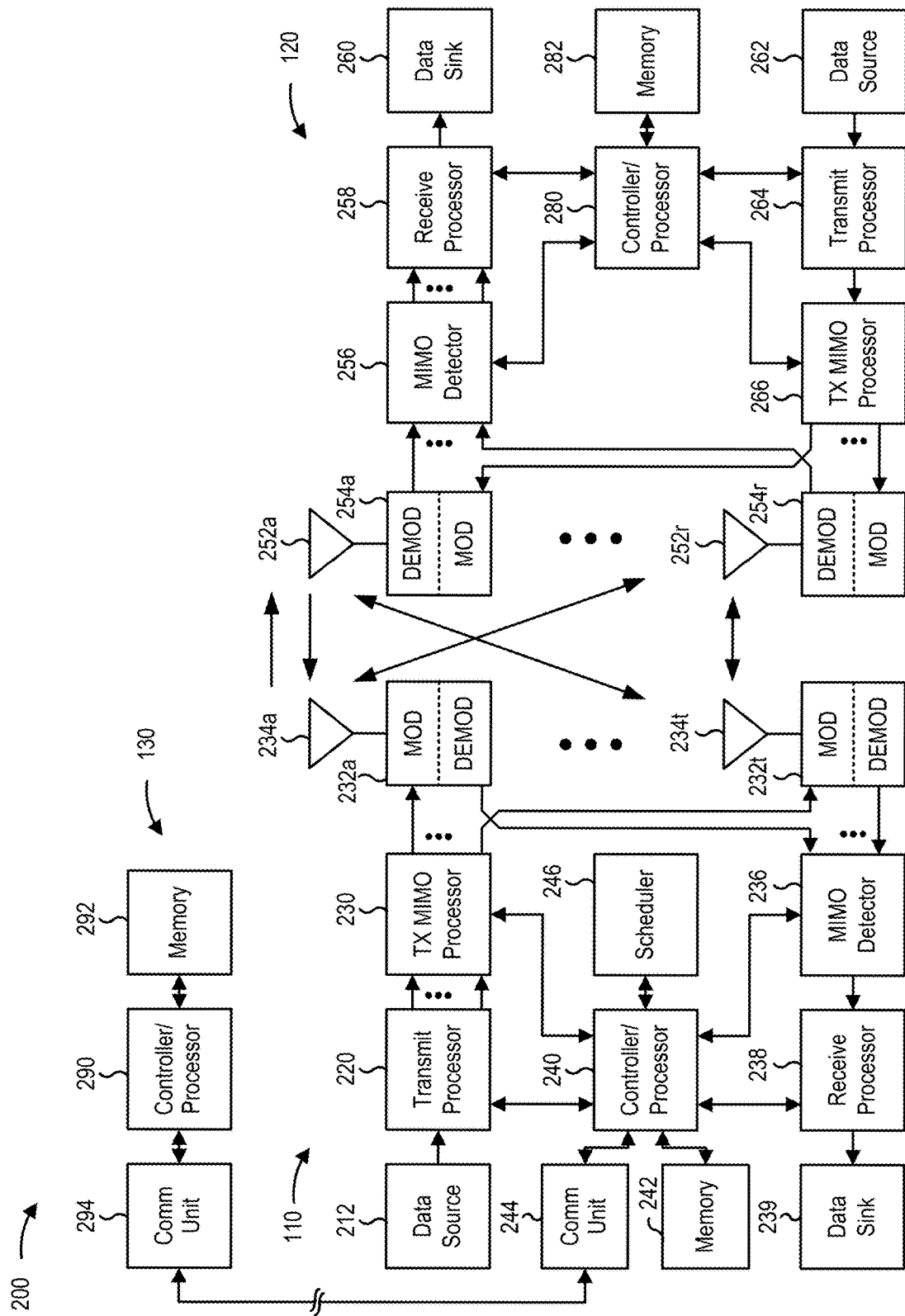
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be pre-coded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with managing multiple simultaneous UL transmissions, as described in more detail elsewhere. For example, the controller/processor 240 of the base station 110, the controller/processor 280 of the UE 120, and/or any other component(s) of FIG. 2 may perform or direct operations of, for example, the processes of FIGS. 4 and 5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving a first configuration, means for receiving a second configuration, determining means, means for transmitting the first uplink transmission and means for transmitting the second uplink transmission. In some aspects, the base station 110 may include means for transmitting a first configuration, means for transmitting a second configuration, means for receiving the first uplink transmission, and means for receiving the second uplink transmission. Such means may include one or more components of the UE 120 or base station 110 described in connection with FIG. 2.

As indicated above, FIG. 2 is provided merely as an example. Other examples may differ from what is described with regard to FIG. 2.

As described, aspects of the present disclosure are directed to managing multiple simultaneous periodic uplink (UL) transmissions. Although a base station may not intend to schedule overlapping transmissions, overlapping transmissions may still occur. UL transmissions are not monolithic, and rather, may vary in terms of importance for communications. For instance, a configured grant in which a UE has data to transmit may have restrictions on latency. Failing to meet such restrictions may result in dropped connections or data loss. On the other hand, where the UL transmission involves a sounding reference signal (SRS) for determining positioning and propagation channel properties, the UL transmission including the SRS may not be as time-sensitive and thus may be a lower priority. For this and other reasons, conventional approaches may treat UL transmissions of SRS as having no priority, which may therefore be deemed as having a low priority.

Still, UL transmission by the UE may be viewed as power limited, as the UE has substantially limited power resources in comparison to the base station to which the UE transmits data. As such, even where a UE may be configured with multiple different beams that may be simultaneously active, operating the multiple beams simultaneously may result in increased battery consumption, more quickly draining the device battery. To address these and other issues, aspects of the present disclosure provide rules or procedures for managing multiple simultaneous uplink transmissions.

In accordance with aspects of the present disclosure, a beam for conducting simultaneous UL transmissions based on configured grants (CGs) with the same priority level may be determined. In some aspects, the beam may be determined based on the component carrier index. For example, if the two UL transmissions are scheduled on two different component carriers (CCs), a UL transmission having the lowest (or the highest) component carrier (CC) index may be prioritized. As such, a transmission configuration indication (TCI) state associated with the UL transmission scheduled on the lowest (or highest) CC index may be used to transmit both of the two UL transmissions. That is, one of the beams will change if simultaneous transmission occurs.

In some aspects, the beam for conducting simultaneous UL transmissions based on CGs with the same priority level may be determined based on a hybrid automatic repeat request (HARQ) identifier (ID). For example, if the two UL transmissions are configured with two different HARQ IDs, then the lowest (or highest) HARQ ID may be prioritized. As such, a TCI state associated with the UL transmission configured with the lowest (or highest) HARQ ID may transmit both of the two UL transmissions on one of the transmissions is dropped.

In some aspects, the beam for conducting simultaneous UL transmissions based on CGs with the same priority level may be determined based on beam measurement results. For instance, the beam may be determined based on the latest beam measurement results on each of the different active beams/TCI states. If one of the measurement results indicate that one of the active beams has a stronger signal (e.g., larger reference signal received power (RSRP)/signal to interference plus noise ratio (SINR)), then the TCI state with a better RSRP/SINR may transmit both of the UL transmissions. Alternatively, the UE drops one of the transmissions.

In other aspects, the beam for conducting simultaneous UL transmissions based on CGs with the same priority level may be determined based on the CG configuration ID. For example, if the two UL transmissions are scheduled with two different CG configurations, each having a CG configuration ID, then the lowest (or highest) CG configuration ID may be prioritized. Thus, the TCI state associated with the lowest (or highest) CG configuration ID may transmit both of the UL CGs.

Additionally, in some aspects, when simultaneous UL transmissions involve two SRSs, a beam may be determined for the simultaneous transmissions. In some aspects, when simultaneous UL transmissions involve two SRSs of the same priority type (e.g., aperiodic), one of the SRSs may be dropped. The SRS UL transmitted (or dropped) may be determined in a manner similar to that specified above for determining a beam for transmitting simultaneous UL CGs. That is, in some aspects, the beam for transmitting both SRSs or the SRS UL transmitted (or dropped) may be determined based on the CC index. For example, the SRS having the lowest (or highest) CC index may be transmitted and the other SRS UL transmission may be dropped.

In some other aspects, the beam for transmitting both SRSs or the SRS UL transmitted (or dropped) may be determined based on the HARQ ID. For example, the SRS having the lowest (or highest) HARQ ID may be transmitted and the other SRS UL transmission may be dropped. In still other aspects, the beam for transmitting both SRSs or the SRS UL transmitted (or dropped) may be determined based on beam measurement results. For instance, the beam for transmitting both SRSs or the SRS UL transmitted (or dropped) may be determined based on the latest beam measurement results on each of the different active beams/TCI states. If one of the measurement results indicate that one of the active beams has a stronger signal (e.g., larger reference signal received power (RSRP)/signal to interference plus noise ratio (SINR)), then the TCI state with better RSRP/SINR may transmit both SRS UL transmissions. Alternatively, the SRS associated with the TCI state with better RSRP/SINR may be transmitted and the other SRS UL transmission may be dropped.

In some aspects, the beam for transmitting both SRSs or the SRS UL transmitted (or dropped) may be determined based on an SRS resource ID or SRS resource set ID. For example, if the two UL SRS transmissions are scheduled with two different SRS configurations including two SRS resource/resource set IDs, then the lowest (or highest) resource/resource set ID may be prioritized. As such, the TCI state associated with the lowest (or highest) resource/resource set ID may transmit both the two UL SRSs from the UE.

Figure 3A:
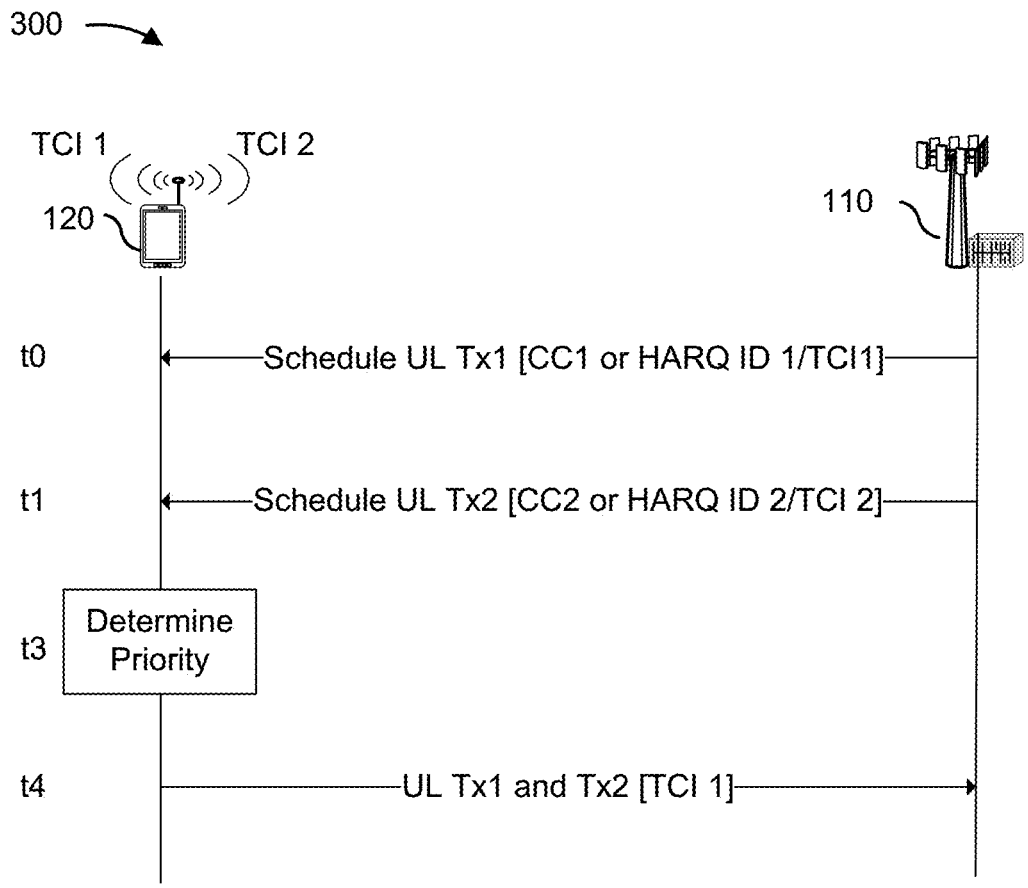
FIG. 3A is a call flow diagram illustrating an example process for managing uplink communications, in accordance with aspects of the present disclosure.

FIG. 3A is a call flow diagram 300 for managing wireless communication involving multiple simultaneous UL transmissions. Referring to FIG. 3A, a UE 120 is in communication with a base station 110. At time t0, the base station 110 may transmit a scheduling grant to the UE 120 to schedule a periodic UL transmission from the UE 120. The UL transmission Tx1 may indicate a resource for use in transmitting the UL data transmission and associated transport format, for instance. The scheduled UL transmission Tx1 may also provide an indication of identification information associated with the transmission such as a component carrier ID (e.g., CC1), a hybrid automatic repeat request ID (e.g., HARQ ID 1) and a transmission configuration indication (e.g., TCI 1) state, for instance. At time t1, the base station 110 may transmit a second scheduling grant to the UE 120, to schedule a second UL transmission from the UE 120. The UL transmission Tx2 may indicate a resource for use in transmitting the UL data transmission and associated transport format, for instance. The scheduled UL transmission Tx2 may also provide an indication of identification information associated with the transmission such as a component carrier ID (e.g., CC2), a hybrid automatic repeat request ID (e.g., HARQ ID 2) and a transmission configuration indication (e.g., TC2 1) state, for instance. At time t3, the UE 120 determines a priority for the UL transmissions Tx1 and Tx2.

As described previously, the UL transmission priority may be determined based on the CC index, a HARQ ID, or based on beam measurement results, for example. At time t4, the UE 120 transmits the UL transmissions Tx1 and Tx2 to the base station 110. In some aspects, the overlapped part of the occasion of the Tx1 and Tx2 may be transmitted with the TCI state (e.g., beam) associated with the higher priority UL transmission. The remainder of the UL transmissions (e.g., non-overlapping) may be transmitted with the TCI state associated with the respective UL transmissions. That is, a beam switch occurs for the non-overlapping portion of lower priority transmission. In other aspects, the entire occasion of both UL transmissions may be processed with the TCI state associated with the higher priority UL transmission. This may be the case even if the overlap only covers a part of the occasion.

Figure 3B:
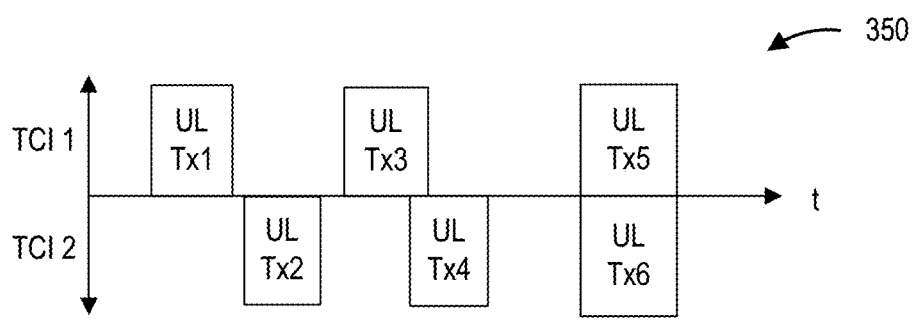
FIG. 3B is a timing diagram illustrating an example of multiple UL transmissions managed, in accordance with aspects of the present disclosure.

FIG. 3B is an example timing diagram 350 illustrating multiple UL transmissions to be communicated, in accordance with aspects of the present disclosure. Referring to FIGS. 3A and 3B, multiple UL transmissions are scheduled to be communicated by the UE 120 to the base station 110. As shown in FIG. 3A, the UE 120 has two active beams, which are respectively configured with TCI states TCI 1 and TCI 2. As shown in the timing diagram 350, UL transmissions UL Tx1, UL Tx3, and UL Tx5 are each associated with TCI state TCI 1. On the other hand, UL transmissions UL Tx2, UL Tx4 and UL Tx6 are each associated with the TCI state TCI 2.

UL transmission UL Tx1 and UL Tx2, do not have an overlapping portion. As such, UL Tx1 and UL Tx2 may be transmitted with their respective TCI states (e.g., TCI 1 and TCI 2) without dropping a portion of either UL transmission.

UL transmissions Tx3 and Tx4 include an overlapping portion. That is, the occasion of the UL transmission Tx4 with a TCI state TCI 2 is schedule to begin before the occasion of the UL transmission Tx3 with the TCI state TCI 1 is scheduled to complete. Accordingly, the UE 120 may determine a priority for conducting the UL transmissions. For example, as described, the priority or hierarchy of the UL transmissions may be determined based on the CC index, HARQ ID, the beam measurement results (e.g., signal strength for the TCI states), and the CG configuration ID. In some aspects, where the UL transmissions both include SRSs with different SRS configurations, the priority may be determined based on the SRS resource ID or resource set ID. Having determined the priority or hierarchy of the UL transmissions, the manner for conducting the UL transmissions may be determined. For instance, in some aspects, the overlapping portion for the lower priority UL transmission may be dropped or may be transmitted using the TCI state associated with the higher priority UL transmission. The remainder of the lower priority UL transmission may be transmitted using the associated TCI state. For example, if the UE 120 determines the UL transmission priority based on beam measurement results, it may be that the signal strength for TCI state TCI 1 is greater than TCI state TCI 2. Because UL transmission Tx3 is associated with TCI 1, the UE 120 may determine that Tx3 has a higher priority than UL transmission Tx4. Thus, the UE 120 may transmit the UL transmission Tx3 to the base station 110 according to the TCI state TCI 1. The overlapped portion of UL transmission Tx4 may be transmitted via TCI state TCI 1 or may be dropped. Then, the remaining portion of the Tx4 may be conducted via TCI state TCI 2. In some aspects, rather than dropping or transmitting the overlapped portion according the TCI state associated with the higher priority transmission, the entire occasion of the lower priority UL transmission may be dropped or may be transmitted according the TCI state associated with the higher priority transmission. Considering the example of UL transmissions Tx3 and Tx4, where UL transmission Tx3 is the higher priority UL transmissions, the entire occasion of the UL transmission Tx4 may be transmitted according to TCI state TCI 1 following the UL transmission Tx3 or the entire occasion of UL transmission Tx4 may be dropped.

In another example, the entire occasions for UL transmission Tx5 and Tx6 may overlap. If the UE 120 determines that UL transmission Tx6 has a higher priority than UL transmission Tx5, then the UE 120 may transmit the Tx6 transmission to the base station 110 according to the TCI state TCI 2. Thereafter, the UE 120 may drop the entire occasion of the UL transmission Tx5 or may transmit the entire occasion of Tx5 to the base station 110 according to the TCI state TCI 2.

As indicated above, FIGS. 3A and 3B are provided as examples. Other examples may differ from what is described with respect to FIGS. 3A and 3B.

Figure 4:
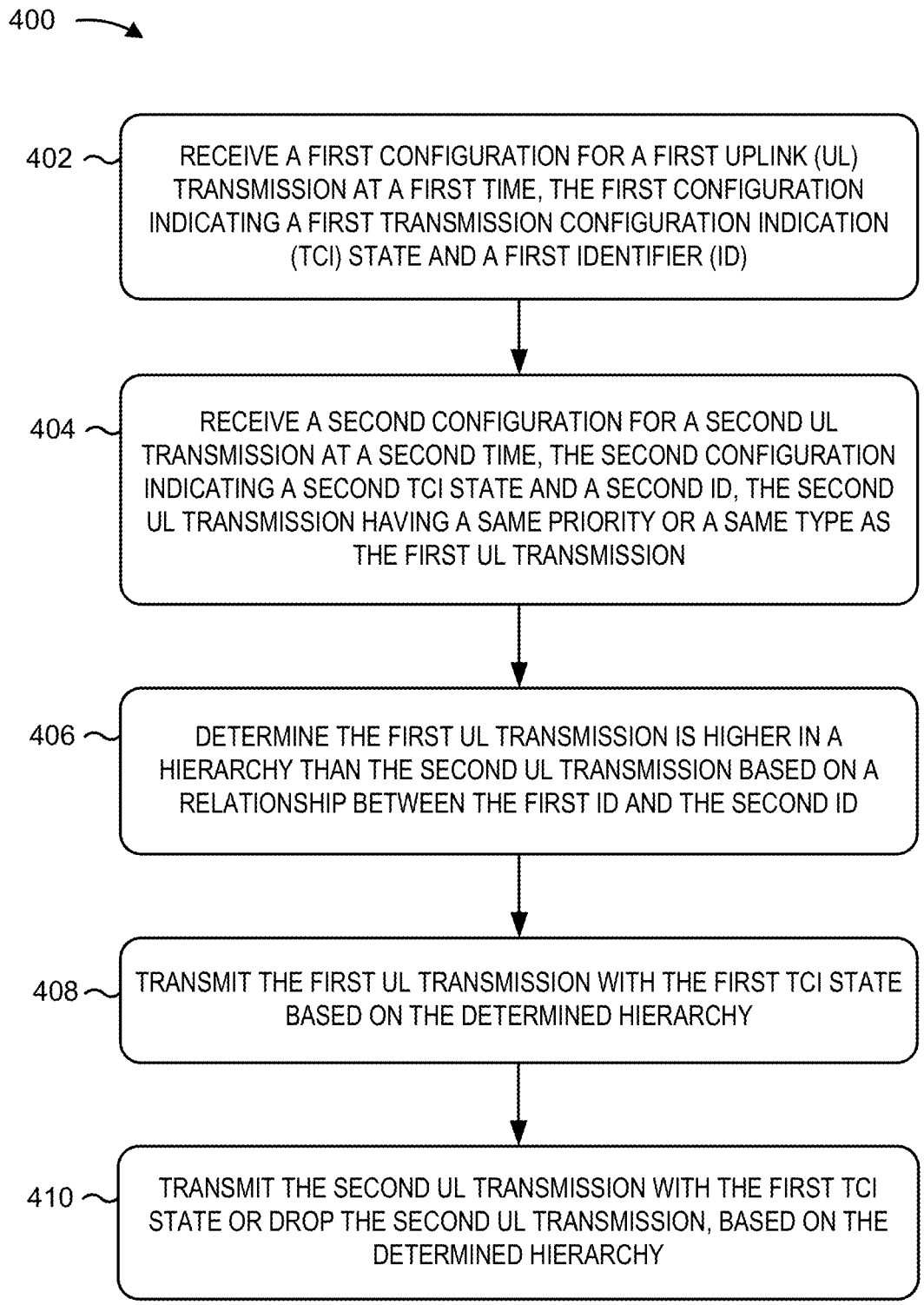
FIG. 4 is a flow diagram illustrating an example process performed, for example, by a user equipment (UE), in accordance with various aspects of the present disclosure.

FIG. 4 is a flow diagram illustrating an example process 400 performed, for example, by a user equipment (UE), in accordance with various aspects of the present disclosure. The example process 400 is an example of wireless communication. At block 402, the UE receives a first configuration for a first uplink (UL) transmission at a first time. The first configuration indicates a first transmission configuration indication (TCI) state and a first identifier (ID). As described with reference to FIG. 3B, the UE 120 has two active beams, which are respectively configured with TCI states TCI 1 and TCI 2. As shown in the timing diagram 350, UL transmissions UL Tx1, UL Tx3, and UL Tx5 are each associated with TCI state TCI 1.

At block 404, the UE receives a second configuration for a second UL transmission at a second time. The second configuration indicates a second TCI state and a second ID, the second UL transmission having a same priority or a same type as the first UL transmission. As described with reference to FIG. 3B, the UE 120 has two active beams, which are respectively configured with TCI states TCI 1 and TCI 2. UL transmissions UL Tx2, UL Tx4 and UL Tx6 are each associated with the TCI state TCI 2.

At block 406, the UE determines the first UL transmission is higher in a hierarchy than the second UL transmission based on a relationship between the first ID and the second ID. For instance, as described with reference to FIG. 3B, the UE 120 may determine a priority for conducting the UL transmissions. For example, as described, the priority or hierarchy of the UL transmissions may be determined based on the CC index, HARQ ID, the beam measurement results (e.g., signal strength for the TCI states), and the CG configuration ID. In some aspects, where the UL transmissions both include SRSs with different SRS configurations, the priority may be determined based on the SRS resource ID or resource set ID.

At block 408, the UE transmits the first UL transmission with the first TCI state based on the determined hierarchy.

For example, as described with reference to FIG. 3B, having determined the priority or hierarchy of the UL transmissions, the manner for conducting the UL transmissions may be determined. For instance, in some aspects, the overlapping portion for the lower priority UL transmission may be dropped or may be transmitted using the TCI state associated with the higher priority UL transmission. The remainder of the lower priority UL transmission may be transmitted using the associated TCI state. For example, if the UE 120 determines the UL transmission priority based on beam measurement results, it may be that the signal strength for TCI state TCI 1 is greater than TCI state TCI 2. Because UL transmission Tx3 is associated with TCI 1, the UE 120 may determine that Tx3 has a higher priority than UL transmission Tx4.

At block 410, the UE transmits the second UL transmission with the first TCI state or drops the second UL transmission, based on the determined hierarchy. For instance, as described with reference to FIG. 3B, the overlapped portion of UL transmission Tx4 may be transmitted via TCI state TCI 1 or may be dropped. Then, the remaining portion of the Tx4 may be conducted via TCI state TCI 2.

FIG. 5 is a flow diagram illustrating an example process 500 performed, for example, by a base station, in accordance with various aspects of the present disclosure. The example process 500 is an example of wireless communication. At block 502, the base station transmits a first configuration for a first uplink (UL) transmission at a first time. The first configuration indicates a first transmission configuration indication (TCI) state and a first identifier (ID). For example, as described with reference to FIG. 3A, at time to, the base station 110 may transmit a scheduling grant to the UE 120 to schedule a periodic UL transmission from the UE 120. The UL transmission Tx1 may indicate a resource for use in transmitting the UL data transmission and associated transport format, for instance. The scheduled UL transmission Tx1 may also provide an indication of identification information associated with the transmission such as a component carrier ID (e.g., CC1), a hybrid automatic repeat request ID (e.g., HARQ ID 1) and a transmission configuration indication (e.g., TCI 1) state, for instance.

At block 504, the base station transmits a second configuration for a second UL transmission at a second time. The second configuration indicates a second TCI state and a second ID. The second UL transmission has a same priority or a same type as the first UL transmission. As shown in FIG. 3A, at time t1, the base station 110 may transmit a second scheduling grant to the UE 120, to schedule a second UL transmission from the UE 120. The UL transmission Tx2 may indicate a resource for use in transmitting the UL data transmission and associated transport format, for instance. The scheduled UL transmission Tx2 may also provide an indication of identification information associated with the transmission such as a component carrier ID (e.g., CC2), a hybrid automatic repeat request ID (e.g., HARQ ID 2) and a transmission configuration indication (e.g., TC2 1) state, for instance. At time t3, the UE 120 determines a priority for the UL transmissions Tx1 and Tx2

At block 506, the base station receives the first UL transmission with the first TCI state. The first UL transmission is higher in a hierarchy than the second UL transmission based on a relationship between the first ID and the second ID.

At block 508, the base station receives the second UL transmission with the first TCI state in accordance with the hierarchy. As described with reference to FIG. 3A, at time t4, the UE 120 transmits the UL transmissions Tx1 and Tx2 to the base station 110. In some aspects, the overlapped part of the occasion of the Tx1 and Tx2 may be transmitted with the TCI state (e.g., beam) associated with the higher priority UL transmission. The remainder of the UL transmissions (e.g., non-overlapping) may be transmitted with the TCI state associated with the respective UL transmissions. That is, a beam switch occurs for the non-overlapping portion of lower priority transmission. In other aspects, the entire occasion of both UL transmissions may be processed with the TCI state associated with the higher priority UL transmission. This may be the case even if the overlap only covers a part of the occasion.

Implementation examples are provided in the following numbered clauses:

1. A method of wireless communication, by a user equipment (UE), comprising:
    receiving a first configuration for a first uplink (UL) transmission at a first time, the first configuration indicating a first transmission configuration indication (TCI) state and a first identifier (ID);
    receiving a second configuration for a second UL transmission at a second time, the second configuration indicating a second TCI state and a second ID, the second UL transmission having a same priority or a same type as the first UL transmission;
    determining the first UL transmission is higher in a hierarchy than the second UL transmission based on a relationship between the first ID and the second ID;
    transmitting the first UL transmission with the first TCI state based on the determined hierarchy; and
    transmitting the second UL transmission with the first TCI state or dropping the second UL transmission, based on the determined hierarchy.
2. The method of clause 1, in which the first UL transmission is a first configured grant and the second UL transmission is a second configured grant.
3. The method of clause 1, in which the first UL transmission is a first sounding reference signal (SRS) and the second UL transmission is a second SRS.
4. The method of any of clauses 1-3, in which the first ID is a first component carrier (CC) index and the second ID is a second CC index, the first UL transmission being determined to be higher in the hierarchy based on whether the first CC index is higher than the second CC index.
5. The method of any of clauses 1-4, in which the first ID is a first hybrid automatic repeat request (HARQ) ID and the second ID is a second HARQ ID, the first UL transmission being determined to be higher in the hierarchy based on whether the first HARQ ID is higher than the second HARQ ID.
6. The method of any of clauses 1-5, in which the first ID is a first configured grant (CG) configuration ID, and the second ID is a second CG configuration ID, the first UL transmission being determined to be higher in the hierarchy based on whether the first CG configuration ID is higher than the second CG configuration ID.
7. The method of any of clauses 1-5, in which the first ID is a first sounding reference signal (SRS) resource ID or a first SRS resource set ID, and the second ID is a second SRS resource ID or second SRS resource set, the first UL transmission being determined to be higher in the hierarchy based on whether the first SRS ID is higher than the second SRS ID or first SRS resource set ID is higher than the second SRS resource set ID.
8. The method of any of clauses 1-7, in which the first ID is a first signal strength associated with the first TCI state and the second ID is a second signal strength associated with the second TCI state, the first signal strength being greater than the second signal strength.
9. The method of any of clauses 1-8, in which the transmitting the second UL transmission with the first TCI state or the dropping the second UL transmission comprises transmitting or dropping a portion of the second UL transmission that overlaps with the first UL transmission.
10. The method of any of clauses 1-9, in which the transmitting the second UL transmission with the first TCI state or the dropping the second UL transmission comprises transmitting or dropping an entire occasion of the second UL transmission.
11. A method of wireless communication, by a base station (BS), comprising:
    transmitting a first configuration for a first uplink (UL) transmission at a first time, the first configuration indicating a first transmission configuration indication (TCI) state and a first identifier (ID);
    transmitting a second configuration for a second UL transmission at a second time, the second configuration indicating a second TCI state and a second ID, the second UL transmission having a same priority or a same type as the first UL transmission;
    receiving the first UL transmission with the first TCI state, the first UL transmission being higher in a hierarchy than the second UL transmission based on a relationship between the first ID and the second ID; and
    receiving the second UL transmission with the first TCI state in accordance with the hierarchy.
12. The method of clause 11, in which the first UL transmission is a first configured grant and the second UL transmission is a second configured grant.
13. The method of clause 11, in which the first UL transmission is a first sounding reference signal (SRS) and the second UL transmission is a second SRS.
14. The method of any of clauses 11-13, in which the first ID is a first component carrier (CC) index and the second ID is a second CC index, the first UL transmission being determined to be higher in the hierarchy based on whether the first CC index is higher than or lower than the second CC index.
15. The method of any of clauses 11-14, in which the first ID is a first hybrid automatic repeat request (HARQ) ID and the second ID is a second HARQ ID, the first UL transmission being determined to be higher in the hierarchy based on whether the first HARQ ID is higher than or lower than the second HARQ ID.
16. The method of any of clauses 11-15, in which the first ID is a first configured grant (CG) configuration ID, and the second ID is a second CG configuration ID, the first UL transmission being determined to be higher in the hierarchy based on whether the first CG configuration ID is higher than or lower the second CG configuration ID.
17. The method of any of clauses 11-15, in which the first ID is a first sounding reference signal (SRS) resource ID or a first SRS resource set ID, and the second ID is a second SRS resource ID or second SRS resource set ID, the first UL transmission being determined to be higher in the hierarchy based on whether the first SRS ID is higher than or lower than the second SRS ID or first SRS resource set ID is higher than or lower than the second SRS resource set ID.

18. The method of any of clauses 11-17, in which the first ID is a first signal strength associated with the first TCI state and the second ID is a second signal strength associated with the second TCI state, the first signal strength being greater than the second signal strength.
19. The method of any of clauses 11-18, in which the received second UL transmission with the first TCI state comprises a portion of the second UL transmission that overlaps with the first UL transmission.
20. The method of any of clauses 11-19, in which the received second UL transmission with the first TCI state comprises an entire occasion of the second UL transmission.
21. An apparatus of wireless communication, by a user equipment (UE), comprising:
    a memory; and
    at least one processor coupled to the memory, the at least one processor being configured:
        to receive a first configuration for a first uplink (UL) transmission at a first time, the first configuration indicating a first transmission configuration indication (TCI) state and a first identifier (ID);
        to receive a second configuration for a second UL transmission at a second time, the second configuration indicating a second TCI state and a second ID, the second UL transmission having a same priority or a same type as the first UL transmission;
        to determine the first UL transmission is higher in a hierarchy than the second UL transmission based on a relationship between the first ID and the second ID;
        to transmit the first UL transmission with the first TCI state based on the determined hierarchy; and
        to transmit the second UL transmission with the first TCI state or dropping the second UL transmission, based on the determined hierarchy.
22. The apparatus of clause 21, in which the first UL transmission is a first configured grant and the second UL transmission is a second configured grant.
23. The apparatus of clause 21, in which the first UL transmission is a first sounding reference signal (SRS) and the second UL transmission is a second SRS.
24 The apparatus of any of clauses 21-23 in which the at least one processor is further configured to transmit or drop a portion of the second UL transmission that overlaps with the first UL transmission.
25. The apparatus of any of clauses 21-24, in which the transmitting the second UL transmission with the first TCI state or the dropping the second UL transmission comprises transmitting or dropping an entire occasion of the second UL transmission.
26. An apparatus of wireless communication, by a base station (BS), comprising:
    a memory; and
    at least one processor coupled to the memory, the at least one processor being configured:
        to transmit a first configuration for a first uplink (UL) transmission at a first time, the first configuration indicating a first transmission configuration indication (TCI) state and a first identifier (ID);
        to transmit a second configuration for a second UL transmission at a second time, the second configuration indicating a second TCI state and a second ID, the second UL transmission having a same priority or a same type as the first UL transmission;
        to receive the first UL transmission with the first TCI state, the first UL transmission being higher in a hierarchy than the second UL transmission based on a relationship between the first ID and the second ID; and
        to receive the second UL transmission with the first TCI state in accordance with the hierarchy.
27. The apparatus of clause 26, in which the first UL transmission is a first configured grant and the second UL transmission is a second configured grant.
28. The apparatus of clause 26, in which the first UL transmission is a first sounding reference signal (SRS) and the second UL transmission is a second SRS.
29. The apparatus of clause 26, in which the first ID is a first component carrier (CC) index and the second ID is a second CC index, the first UL transmission being determined to be higher in the hierarchy based on whether the first CC index is higher than or lower than the second CC index.
30 The apparatus of any of clauses 26-29, in which the received second UL transmission with the first TCI state comprises a portion of the second UL transmission that overlaps with the first UL transmission.
31. The apparatus of any of clauses 26-29, in which the received second UL transmission with the first TCI state comprises an entire occasion of the second UL transmission.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
   receiving a first configuration for a first periodic uplink (UL) transmission at a first time, the first configuration indicating a first transmission configuration indication (TCI) state and a first identifier (ID) associated with the first UL transmission;
   receiving a second configuration for a second periodic UL transmission at a second time, the second configuration indicating a second TCI state and a second ID associated with the second UL transmission, the second UL transmission having a same priority or a same type as the first UL transmission;
   determining the first UL transmission is higher in a hierarchy than the second UL transmission based on a relationship between the first ID associated with the first UL transmission and the second ID associated with the second UL transmission;
   transmitting the first UL transmission with the first TCI state based on the determined hierarchy; and
   transmitting the second UL transmission with the first TCI state based on the determined hierarchy.

2. The method of claim 1, in which the first UL transmission is a first configured grant and the second UL transmission is a second configured grant.

3. The method of claim 1, in which the first UL transmission is a first sounding reference signal (SRS) and the second UL transmission is a second SRS.

4. The method of claim 1, in which the first ID is a first component carrier (CC) index and the second ID is a second CC index, the first UL transmission being determined to be higher in the hierarchy based on whether the first CC index is higher than the second CC index.

5. The method of claim 1, in which the first ID is a first hybrid automatic repeat request (HARQ) ID and the second ID is a second HARQ ID, the first UL transmission being determined to be higher in the hierarchy based on whether the first HARQ ID is higher than the second HARQ ID.

6. The method of claim 1, in which the first ID is a first configured grant (CG) configuration ID, and the second ID is a second CG configuration ID, the first UL transmission being determined to be higher in the hierarchy based on whether the first CG configuration ID is higher than the second CG configuration ID.

7. The method of claim 1, in which the first ID is a first sounding reference signal (SRS) resource ID or a first SRS resource set ID, and the second ID is a second SRS resource ID or second SRS resource set, the first UL transmission being determined to be higher in the hierarchy based on whether the first SRS ID is higher than the second SRS ID or first SRS resource set ID is higher than the second SRS resource set ID.

8. The method of claim 1, in which the first ID is a first signal strength associated with the first TCI state and the second ID is a second signal strength associated with the second TCI state, the first signal strength being greater than the second signal strength.

9. The method of claim 1, in which the transmitting the second UL transmission with the first TCI state comprises transmitting a portion of the second UL transmission that overlaps with the first UL transmission.

10. The method of claim 1, in which the transmitting the second UL transmission with the first TCI state comprises transmitting an entire occasion of the second UL transmission.

11. A method of wireless communication, by a base station (BS), comprising:
    transmitting a first configuration for a first periodic uplink (UL) transmission at a first time, the first configuration indicating a first transmission configuration indication (TCI) state and a first identifier (ID) associated with the first UL transmission;
    transmitting a second configuration for a second periodic UL transmission at a second time, the second configuration indicating a second TCI state and a second ID associated with the second UL transmission, the second UL transmission having a same priority or a same type as the first UL transmission;
    receiving the first UL transmission with the first TCI state, the first UL transmission being higher in a hierarchy than the second UL transmission based on a relationship between the first ID associated with the first UL transmission and the second ID associated with the second UL transmission; and
    receiving the second UL transmission with the first TCI state in accordance with the hierarchy.

12. The method of claim 11, in which the first UL transmission is a first configured grant and the second UL transmission is a second configured grant.

13. The method of claim 11, in which the first UL transmission is a first sounding reference signal (SRS) and the second UL transmission is a second SRS.

14. The method of claim 11, in which the first ID is a first component carrier (CC) index and the second ID is a second CC index, the first UL transmission being determined to be higher in the hierarchy based on whether the first CC index is higher than or lower than the second CC index.

15. The method of claim 11, in which the first ID is a first hybrid automatic repeat request (HARQ) ID and the second ID is a second HARQ ID, the first UL transmission being determined to be higher in the hierarchy based on whether the first HARQ ID is higher than or lower than the second HARQ ID.

16. The method of claim 11, in which the first ID is a first configured grant (CG) configuration ID, and the second ID is a second CG configuration ID, the first UL transmission being determined to be higher in the hierarchy based on whether the first CG configuration ID is higher than or lower than the second CG configuration ID.

17. The method of claim 11, in which the first ID is a first sounding reference signal (SRS) resource ID or a first SRS resource set ID, and the second ID is a second SRS resource ID or second SRS resource set ID, the first UL transmission being determined to be higher in the hierarchy based on whether the first SRS ID is higher than or lower than the second SRS ID or first SRS resource set ID is higher than or lower than the second SRS resource set ID.

18. The method of claim 11, in which the first ID is a first signal strength associated with the first TCI state and the second ID is a second signal strength associated with the second TCI state, the first signal strength being greater than the second signal strength.

19. The method of claim 11, in which the received second UL transmission with the first TCI state comprises a portion of the second UL transmission that overlaps with the first UL transmission.

20. The method of claim 11, in which the received second UL transmission with the first TCI state comprises an entire occasion of the second UL transmission.

21. An apparatus of wireless communication, by a user equipment (UE), comprising:
at least one memory; and
at least one processor coupled to the at least one memory, the at least one processor being configured:
to receive a first configuration for a first periodic uplink (UL) transmission at a first time, the first configuration indicating a first transmission configuration indication (TCI) state and a first identifier (ID) associated with the first UL transmission;
to receive a second configuration for a second periodic UL transmission at a second time, the second configuration indicating a second TCI state and a second ID associated with the second UL transmission, the second UL transmission having a same priority or a same type as the first UL transmission;
to determine the first UL transmission is higher in a hierarchy than the second UL transmission based on a relationship between the first ID associated with the first UL transmission and the second ID associated with the second UL transmission;
to transmit the first UL transmission with the first TCI state based on the determined hierarchy; and
to transmit the second UL transmission with the first TCI state, based on the determined hierarchy.

22. The apparatus of claim 21, in which the first UL transmission is a first configured grant and the second UL transmission is a second configured grant.

23. The apparatus of claim 21, in which the first UL transmission is a first sounding reference signal (SRS) and the second UL transmission is a second SRS.

24. The apparatus of claim 21, in which the at least one processor is further configured to transmit the second UL transmission that overlaps with the first UL transmission.

25. The apparatus of claim 21, in which the transmitting the second UL transmission with the first TCI state comprises transmitting an entire occasion of the second UL transmission.

26. An apparatus of wireless communication, by a base station (BS), comprising:
at least one memory; and
at least one processor coupled to the at least one memory, the at least one processor being configured:
to transmit a first configuration for a first uplink (UL) transmission at a first time, the first configuration indicating a first transmission configuration indication (TCI) state and a first identifier (ID) associated with the first UL transmission;
to transmit a second configuration for a second UL transmission at a second time, the second configuration indicating a second TCI state and a second ID associated with the second UL transmission, the second UL transmission having a same priority or a same type as the first UL transmission;
to receive the first UL transmission with the first TCI state, the first UL transmission being higher in a hierarchy than the second UL transmission based on a relationship between the first ID associated with the first UL transmission and the second ID associated with the second UL transmission; and
to receive the second UL transmission with the first TCI state in accordance with the hierarchy.

27. The apparatus of claim 26, in which the first UL transmission is a first configured grant and the second UL transmission is a second configured grant.

28. The apparatus of claim 26, in which the first UL transmission is a first sounding reference signal (SRS) and the second UL transmission is a second SRS.

29. The apparatus of claim 26, in which the first ID is a first component carrier (CC) index and the second ID is a second CC index, the first UL transmission being determined to be higher in the hierarchy based on whether the first CC index is higher than or lower than the second CC index.

30. The apparatus of claim 26, in which the received second UL transmission with the first TCI state comprises a portion of the second UL transmission that overlaps with the first UL transmission.

31. The apparatus of claim 26, in which the received second UL transmission with the first TCI state comprises an entire occasion of the second UL transmission.

* * * * *